US010296343B2

United States Patent
Mekkat et al.

(10) Patent No.: US 10,296,343 B2
(45) Date of Patent: May 21, 2019

(54) HYBRID ATOMICITY SUPPORT FOR A BINARY TRANSLATION BASED MICROPROCESSOR

(71) Applicant: Intel Corporation, Santa Clara, CA (US)

(72) Inventors: Vineeth Mekkat, San Jose, CA (US); Jason M. Agron, San Jose, CA (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 78 days.

(21) Appl. No.: 15/474,666

(22) Filed: Mar. 30, 2017

(65) Prior Publication Data
US 2018/0285112 A1    Oct. 4, 2018

(51) Int. Cl.
| | |
|---|---|
| *G06F 9/44* | (2018.01) |
| *G06F 9/52* | (2006.01) |
| *G06F 12/08* | (2016.01) |
| *G06F 9/30* | (2018.01) |
| *G06F 9/38* | (2018.01) |
| *G06F 12/0875* | (2016.01) |
| *G06F 9/46* | (2006.01) |

(52) U.S. Cl.
CPC ...... *G06F 9/30174* (2013.01); *G06F 9/30101* (2013.01); *G06F 9/3842* (2013.01); *G06F 12/0875* (2013.01); *G06F 9/30116* (2013.01); *G06F 9/3857* (2013.01); *G06F 9/3863* (2013.01); *G06F 9/461* (2013.01); *G06F 9/467* (2013.01); *G06F 9/528* (2013.01); *G06F 2212/1016* (2013.01); *G06F 2212/452* (2013.01); *G06F 2212/507* (2013.01)

(58) Field of Classification Search
CPC ............. G06F 9/30174; G06F 9/30101; G06F 9/3842; G06F 9/30116; G06F 9/3861; G06F 9/3863; G06F 9/461; G06F 9/3857; G06F 9/3859; G06F 9/466; G06F 9/467; G06F 9/528; G06F 12/0875; G06F 2212/452
USPC ................................ 712/226, 216–219, 248
See application file for complete search history.

(56) References Cited

U.S. PATENT DOCUMENTS

| 6,011,908 A | 1/2000 | Wing et al. | |
|---|---|---|---|
| 9,009,020 B1 * | 4/2015 | Oskin | G06F 9/455 703/22 |

(Continued)

OTHER PUBLICATIONS

Edson Borin et al., "TAO: Two-level Atomicity for Dynamic Binary Optimizations", Apr. 24-28, 2010, 10 pages.

*Primary Examiner* — Daniel H Pan
(74) *Attorney, Agent, or Firm* — Lowenstein Sandler LLP

(57) ABSTRACT

A processing device including a first shadow register, a second shadow register, and an instruction execution circuit, communicatively coupled to the first shadow register and the second shadow register, to receive a sequence of instructions comprising a first local commit marker, a first global commit marker, and a first register access instruction referencing an architectural register, speculatively execute the first register access instruction to generate a speculative register state value associated with a physical register, responsive to identifying the first local commit marker, store, in the first shadow register, the speculative register state value, and responsive to identifying the first global commit marker, store, in the second shadow register, the speculative register state value.

19 Claims, 12 Drawing Sheets

(56) References Cited

U.S. PATENT DOCUMENTS

| | | | |
|---|---|---|---|
| 2011/0307689 A1* | 12/2011 | Chung | G06F 9/3004 712/234 |
| 2014/0156933 A1* | 6/2014 | Shaikh | G06F 12/0875 711/123 |
| 2015/0006496 A1* | 1/2015 | Rajwar | G06F 9/467 707/703 |

* cited by examiner

200

| Original x86 code | Code After Binary Translation |
|---|---|
| XBEGIN<br>Loop:<br>    LD [A]<br>    ALU_OP<br>    ST [A]<br>    JCC Loop<br>XEND | *CMIT.GLOBAL*<br>Loop:   (*CMIT.LOCAL*)<br>    LD [A]<br>    ALU_OP<br>    ST [A]<br>    JCC Loop<br>*CMIT.GLOBAL* |

202 → Original x86 code
204 → Code After Binary Translation
206 → Loop:

*Figure 2*

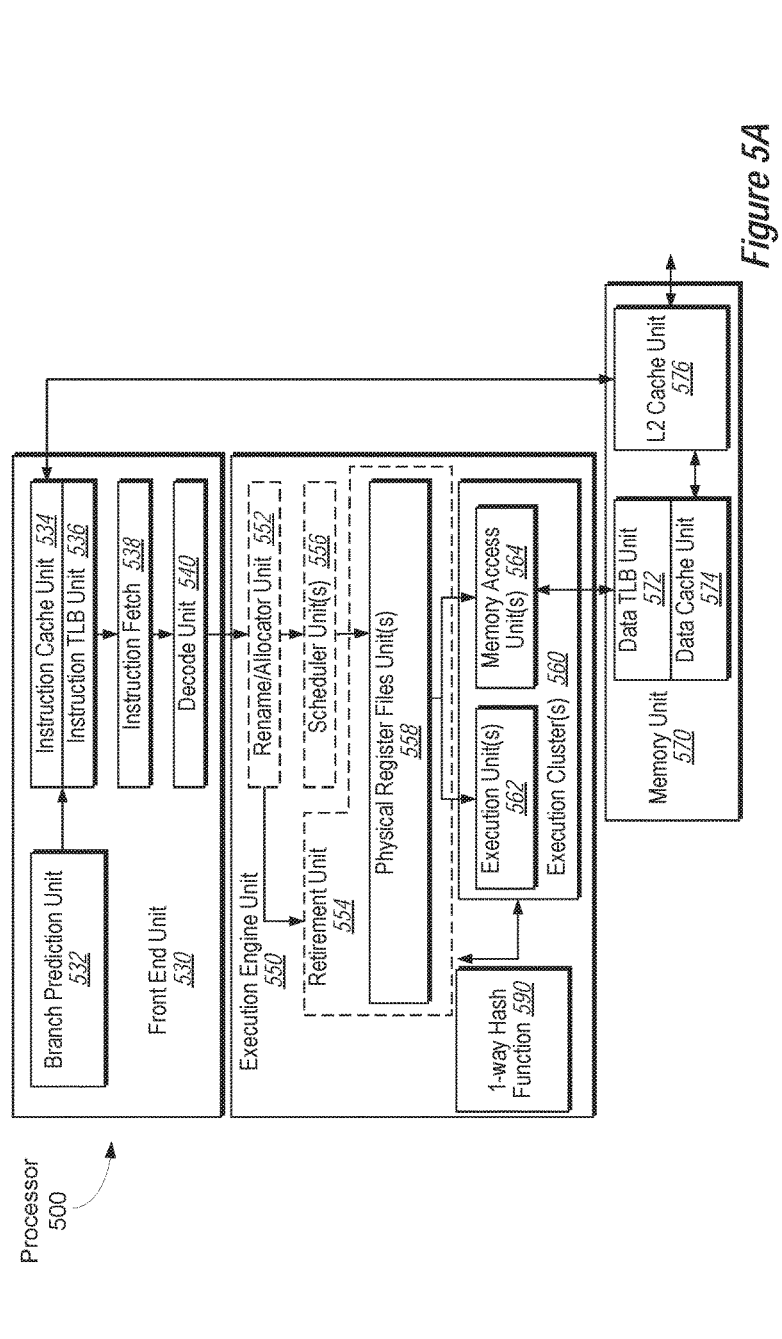
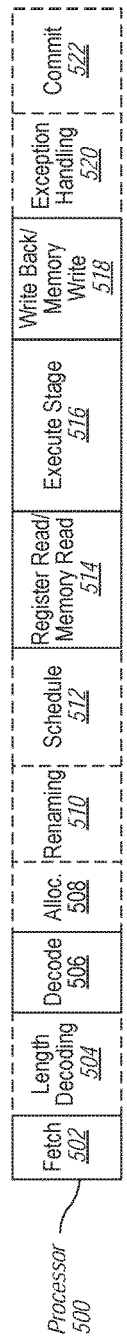
*Figure 5A*
*Figure 5B*

HYBRID ATOMICITY SUPPORT FOR A BINARY TRANSLATION BASED MICROPROCESSOR

TECHNICAL FIELD

Embodiments of the disclosure relate generally to microprocessors and more specifically, but without limitation, to hybrid atomicity support for a binary translation based (BT-based) microprocessor.

BACKGROUND

Multi-core processors are found in most computing systems today, including servers, desktops and a System on a Chip (SoC). Computer systems that utilize these multi-core processors may execute instructions of various types of code. Often, the code is not designed for a particular processor, and therefore, needs to be translated into a target code.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 illustrates code examples including code generated by a binary translator according to an embodiment of the present disclosure.

FIG. 5A is a block diagram illustrating a micro-architecture for a processor including heterogeneous core in which one embodiment of the disclosure may be used.

FIG. 5B is a block diagram illustrating an in-order pipeline and a register renaming stage, out-of-order issue/execution pipeline implemented according to at least one embodiment of the disclosure.

DETAILED DESCRIPTION

Figure 1:
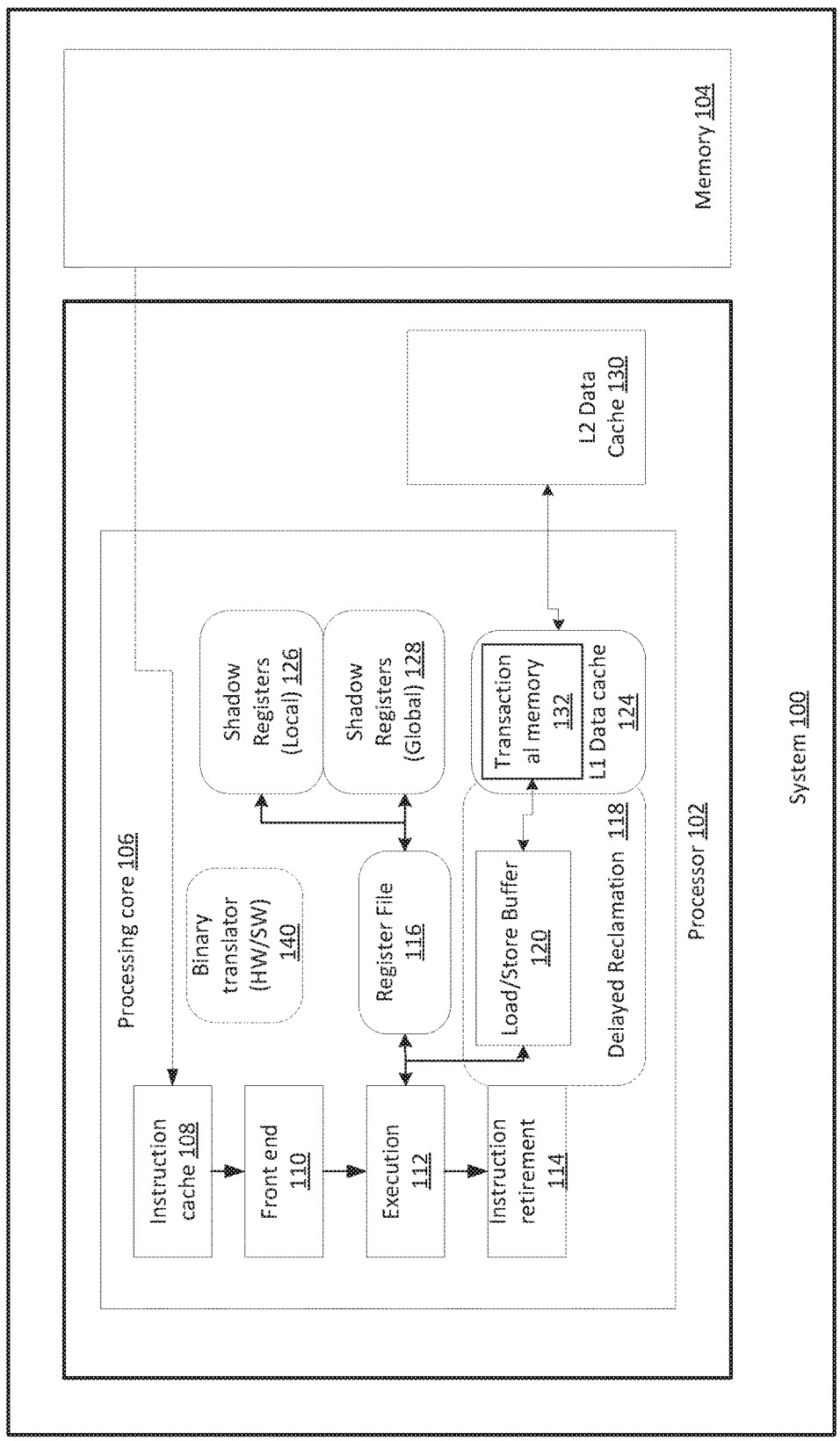
FIG. 1 illustrates a processing system according to an embodiment of the present disclosure.

Certain multi-core processors may include a binary translator that generates the target code that may be executed on a target platform. The translated code may be optimized using certain optimization techniques. The optimization may include reordering of instructions. Hence, the optimized group of instructions should be executed atomically. The atomicity may guarantee the result consistency between the out-of-order execution (i.e., the execution of the reordered group of instructions) and the in-order execution (i.e., the execution of the original group of instructions). In some computer systems, effective optimisation techniques can improve performance and reduce power consumption. During runtime, the binary translator can reorder the placement of instructions of the code. In some systems, memory access instructions (instructions that modify a memory location) or register access instructions (instructions that modify a physical register) can be executed in a different order than the order in which the instructions were fetched and decoded (referred to as out-of-order execution). For example, the binary translator can reorder the execution of certain memory access instructions according to particular optimization procedures. In such systems, these techniques for reordering memory (or register) access instructions are shown to be effective mechanisms for improving the performance of microprocessors supporting out-of-order (OoO) instruction execution.

A microprocessors (referred to as a processor herein) may rely on hardware mechanism (e.g., hardware transactional memory) to support atomicity needed in the OoO execution of instructions. The processor may execute data access instructions directed at storage devices (e.g., a register or a memory). The atomicity of a transaction including the execution of two or more instructions guarantees that the transaction completes or has no effect on the storage device (i.e., aborted transaction does not change the content in the storage). To achieve the atomicity for the execution of a set of instructions associated with a transaction, the system may need to create a checkpoint that captures the starting state of the system (including memory state values and register state values). Register and memory state values may define correct data values for corresponding registers and memory locations when the state of the microprocessor was known to be correct (non-speculative). The system may roll back to the checkpoint responsive to detecting a rollback event occurred during the transaction. The rollback guarantees that a failed transaction does not affect the state values of the system. A processor may be configured with a transaction memory to track the internal state of the processor, where the internal state may include the memory state values and register state values that can be used for the rollback. In some implementations to improve the speed of execution, a processor may implement a hardware transaction memory that includes logic circuitry to track which cache lines are associated with a read or write instruction. The hardware transactional memory implemented on processors, although providing reliable and built-in atomicity that guarantees sequential consistency in the final result, may incur significant overhead on the processor performance, in particular, for BT-based processors as explained in the following sections.

Processors that are designed to execute reordered binary translation (BT) instructions may need to be in the atomic transactional mode constantly through back-to-back transactions. These processors are referred to as BT-based processors. BT-based processors perform speculative optimizations for power and performance gains. The BT-based processor rolls back to a correct state if the speculative execution of the code does not provide correct results. The code may include region boundaries that define point of time in execution where the processor state (memory and register) are correct and can be made visible to external world (other processors). The execution of instructions in between those boundaries (i.e., speculative execution) should appear atomic to the outside world. Thus, BT-based processors need to be in atomic state all the time. BT-based processor may use existing hardware transactional memory for this, but it incurs high performance overhead that could nullify the performance gain achieved by binary translation optimization. For such situations, the BT-based processors may employ a light-weight atomic mechanism (rather than the heavy-weight hardware transactional memory) to reduce the overhead associated with the transactions, where the heavy-weight means a large processor overhead and the light-weight means a small processor overhead. In some implementations, the BT-based processors may use a buffer that is not part of the data cache but is communicatively coupled to a data cache, to temporarily hold the memory store instructions prior to an atomic commit to the data cache. Thus, implementations of the BT-based processors typically do not support the heavy-weight hardware transactional memory because of the high overhead associated with the hardware transactional memory. The hardware transactional memory, however, may be useful for a BT-based processor as the hardware transactional memory can accommodate a large number of load/store operations and can be used to optimize the code execution in certain situations (e.g., the optimization of loops using loop invariant code motion (LICM), load hoisting, load elimination, etc.). Further, BT-based processors may need to provide backward compatibility to support hardware transactional memory.

Embodiments of the present disclosure may include a processor architecture that supports two types of commit modes (global commit mode and local commit mode) for speculatively executed instructions, where an instruction may modify at least one of a memory location or a physical register. A code (e.g., the code generated by a binary translator) may include a local commit marker identifying a section of the code that is to be speculatively executed and then committed under a local commit mode supported by the processor architecture, wherein the local commit markers may be inserted by a code developer or a compiler. The code may further include a global commit marker identifying another section of the code that is to be speculatively executed and then committed under a global commit mode also supported by the processor architecture, wherein the global commit markers may be inserted by the binary translator. The global commit code regions can leverage the transaction memory (or cache-base atomicity), whereas local commit code regions are subject to delayed reclamation of store/load buffers.

The processor architecture of the present disclosure may support both the local commit mode and the global commit mode in the code. For an instruction modifying a memory location, the processor may support delayed instruction reclamation by storing the speculative memory state value in a buffer under the local commit mode. The instruction reclamation is delayed as compared to reclamation without atomicity. Storing in the buffer may delay the commit to the transactional memory until the occurrence of a global commit event. For an instruction referencing a physical register, the processor may store the speculative register state value in a first shadow register set associated with the local commit mode, and store the speculative register state value in a second shadow register set associated with the global commit mode. The content of the first shadow register may be copied to an architectural register responsive to a local commit event while the content of the second shadow register may be copied to the architectural register responsive to a global commit event (a detailed description is provided in conjunction with FIG. 3). An architectural register is the logical register specified as an operand of the instruction to store the result value. The processor may implement register renaming to dynamically map, using a Register Alias Table (RAT), logical registers to physical registers in a physical register file. Thus, the disclosure provides a technical solution that supports both types of commits specified in an optimized code reordered by a binary translator.

FIG. 1 illustrates a processing system 100 according to an embodiment of the present disclosure. As shown in FIG. 1, processing system 100 (e.g., a system-on-a-chip (SOC) or a motherboard of a computer system) may include a processor 102 and a memory device 104 communicatively coupled to processor 102. Processor 102 may be a hardware processing device such as, for example, a central processing unit (CPU) or a graphic processing unit (GPU) that includes one or more processing cores to execute software applications.

Processor 102 may further include processing core 106 and a level-2 (L2) cache shared with another processing core similar to processing core 106. Processing core 106 in various implementations may be capable of in-order cores or out-of-order execution of instructions. In an illustrative example, processing core 106 may have a micro-architecture including processor logic and circuits used to implement an instruction set architecture (ISA). Processors 102 with different micro-architectures can share at least a portion of a common instruction set. For example, the same register architecture of the ISA may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file), as illustrated in conjunction with FIGS. 5A-5B. During execution of an instruction referencing a register, a dynamically-allocated register may be used to hold data value. The data value may be overwritten until the data value is moved to an architectural register (i.e., those registers that are visible to a programmer The content of the architectural register needs to be correct when the code reads the content).

Referring to FIG. 1, processing core 106 may further include an instruction cache 108, a front end circuit 110, an execution circuit 112, an instruction retirement circuit 114, a register file 116, an instruction delayed reclamation circuit 118 (including a load/store buffer 120), a level-1 (L1) data cache 124, a first shadow register set 126, and a second shadow register set 128. Processing core 106 may optionally include a binary translator 140 for re-ordering instructions into a target code that may be executed speculatively in an OoO fashion. In one embodiment, binary translator 140 may be implemented in logic circuit as a hardware component of processing core 106. In another embodiment, binary translator 140 may be implemented as a software application running on processing core 106.

Instruction cache circuit 108 may be coupled to an instruction fetch circuit (not shown). Instruction cache circuit 108 may receive and store instructions retrieved by the instruction fetch circuit. In one embodiment, binary translator 140 may receive a sequence of instructions from instruction cache circuit 108 and perform code optimization by re-ordering instructions in the code to generate a target code. The target code, after the code optimization by binary translator 140, may include local commit markers identifying sections of code to be executed under the local commit mode and global commit markers identifying sections of code to be executed under the global commit mode. The local commit markers can be inserted by binary translator 140. Alternatively, the global commit markers can be inserted by an application developer.

FIG. 2 illustrates code examples 200 including code 204 generated by a binary translator according to an embodiment of the present disclosure. The original code 202 (e.g., x86 instruction code) may include a loop 206 including several instructions. Binary translator 140 may, based on code 202, generate target code 204. In target code 204, binary translator 140 may specify, using local commit markers (e.g., CMIT.LOCAL), sections of code under the local commit mode, and specify, using global commit markers (e.g., CMIT.GLOBAL), sections of code under the global commit mode. For example, code 204 may run under the local commit mode within loop 206 and run under the global commit mode outside the loop 206.

Referring to FIG. 1, front end circuit 110 may receive the target code 204 generated by binary translator 140 to perform pre-processing prior to execution. In one embodiment, front end circuit 110 may include an instruction decoder circuit that may translate an instruction into the address in the micro memory where the micro code for the instruction starts. Front end circuit 110 may feed the instructions to instruction execution circuit 112 for speculative execution.

Processing core 106 may include logic circuits to support the both the local commit mode and the global commit mode specified in the target code. Processing core 106 may provide different hardware components to handle the instructions referencing a memory location in memory 104 (referred to as a memory access instruction) and instructions referencing a physical register of register file 116 (referred to as a register access instruction).

In this regard, processing core 106 may include register file 116 that may include physical registers that can be referenced by register access instructions. These physical registers may be renamed and/or overwritten before a commit event occurs. Processing core 112 may further include shadow register sets 126, 128, coupled to register file 116, to maintain a copy of the content of register file 116. In some implementations, the shadow register sets may maintain both a speculative copy and a non-speculative copy of every physical register in register file 116. Execution of subsequent register access instructions may cause overwrite of the content in the physical register, causing an update of the speculative copy in the corresponding shadow register. A commit event (e.g., identifying, by instruction execution circuit 112, the "COMMIT. GLOBAL" marker or the "COMMIT.LOCAL" marker) may trigger the conversion of all speculative copies in register file 116 into non-speculative.

In one embodiment, to improve the efficiency, shadow register sets 126, 128 may be implemented as a copy-on-write (CoW) structure that maintains a first-in-first-out (FIFO) mapping between a physical register and the architectural register. A physical register referenced by the register access instruction during execution is referred to as a "live" physical register. The shadow register sets 126, 128 may maintain a shadow copy responsive to the first overwrite of a "live" physical register. This overwrite, however, does not cause instruction retirement circuit 114 to reclaim the physical register for other register access instructions. The shadow register sets 126, 128 do not maintain the content for subsequent overwrites of the live physical register because they do not represent a rollback state value for the atomic transaction. Responsive to the retirement of a global or local commit event (e.g., by identifying a subsequent global or local commit marker), the live physical register is reclaimed and the content of the live physical register becomes non-speculative. Thus, the CoW shadow register sets 126, 128 may eliminate the need for multiple copy operations from the physical register to the shadow register sets 126, 128 in response to frequent overwrites.

In one embodiment, shadow register set 126 is associated with a local commit mode, and shadow register set 128 is associated with a global commit mode. Shadow register set 126 may maintain the original content of live physical registers under the local commit mode, and shadow register set 128 may maintain the original content of live physical registers under the global commit mode. Responsive to a local commit event, instruction retirement circuit 114 may reclaim live physical registers under the local commit mode. Responsive to a global commit event, instruction retirement circuit 114 may reclaim live physical registers under the global commit mode.

Processing core 106 may further include a level-1 (L1) data cache 124 that may include the implementation of a transactional memory 132. Transactional memory 132, as discussed above, may provide the atomicity of a memory transaction by a memory access instruction referencing a memory location. Transaction memory 132 may include logic circuit to track the memory state values that can be used for the rollback. In one embodiment, the transactional memory may track read or write instructions associated with cache lines. Transactional memory 132 may include a cache line to store a copy of the content associated with the memory location. The copy is referred to as the memory state value at the memory location. In one embodiment, the cache line may further include a status flag to indicate whether the cache is speculative. For example, the status flag may be set (to "1") to indicate the speculative status, and cleared (to "0") to indicate the non-speculative status. In one embodiment, the read (RD) bit and/or write (WR) bit of the cache line is used to indicate the speculation status. The RD bit when set may indicate that the cache line is associated with a read instruction, and the WR bit when set may indicate that the cache line is associated with a write instruction.

In one embodiment, under the global commit mode, the speculative memory state value associated with a memory location is maintained in the cache line. All the speculative cache lines are set to non-speculative (e.g., by clearing the speculation status bit) responsive to a commit event.

To improve the performance under the local commit mode, processing core 106 may include a delayed reclamation circuit 118 to temporarily hold the memory state values that may be later copied to transactional memory 132. In one embodiment, delayed reclamation circuit 118 may include a load/store buffer 120. Responsive to identifying a local commit marker (e.g., COMMIT.LOCAL), instruction execution circuit 112 may first create a local checkpoint captured responsive to identifying the local commit marker. Further, instruction execution circuit 120 may speculatively execute a memory access instruction modifying a memory location. Under the local commit mode, instruction execution circuit 112 may, responsive to speculatively executing a memory access instruction, store the speculative memory state in the load/store buffer 120. Responsive to the execution of another memory access instruction modifying the memory location, instruction execution circuit 112 may modify the speculative memory state value stored in the load/store buffer 120 to a new value. Responsive to a commit event (e.g., identifying a second local commit marker), instruction execution circuit 112 may move the speculative memory state value from the load/store buffer 120 to transactional memory 130 as a cache line. Here, the commit event (e.g., identifying a local commit marker) serves as the conclusion of a previous local commit mode and the beginning of a new local commit mode. The speculation status of the cache line can be set to the speculative status (set to "1").

In the following, the hybrid atomicity support is discussed according to the global commit mode and local commit mode.

Embodiments of the present disclosure may provide different components and methods for handling speculatively-executed memory access instructions and speculatively-executed register access instructions under the global commit mode. Instruction execution circuit 112 may receive a sequence of instructions including global commit markers (e.g., COMMIT.GLOBAL as shown in FIG. 2). The sequence of instructions may have been generated by binary translator 140 with code optimization. Thus, the execution of the sequence of instructions may include the OoO speculative execution. Responsive to identifying a global commit marker, instruction execution circuit 112 may first create a global checkpoint (a reference to a memory location that stores the preserved memory state values and register state values) to which processing core 106 may roll back in the event that a global rollback event occurs. A global rollback event occurs when a processor fault causes the processor to roll back to the state values referenced by the global checkpoint. For concise discussion, the creation of the global checkpoint and the detection of the global rollback event are provided in conjunction with FIGS. 3A-3B. Further, responsive to identifying the global commit marker, instruction execution circuit 112 may start to speculatively execute instructions under the global commit mode.

Under the global commit mode, instruction execution circuit 112 may identify a memory access instruction (e.g., an instruction that modifies a memory location) and speculatively execute the memory access instruction. The execution of the memory access instruction may cause a cache controller to generate a cache line item in transactional memory 132 of the data cache 124 and store a copy of the memory state value in the cache line. In one embodiment, instruction execution circuit 112 may also set the speculation bit to the "speculative" status, where the speculation bit can be the RD/WT bit indicating that the cache line has been accessed by a memory access instruction.

Instruction execution circuit 112 may further identify a register access instruction (e.g., an instruction that modifies a physical register) and speculatively execute the register access instruction. During execution of an instruction, instruction execution circuit 112 may store the speculative register value in global shadow register 128, where the global shadow register is implemented as a CoW structure. The speculative register value in global shadow register 128 is copied to the physical register responsive to a global commit event.

In response to a global commit event (e.g., identifying a second global commit marker), instruction execution circuit 112 may cause the cache controller to clear the speculation bit in the cache line of the transactional memory 132. Instruction execution circuit 112 may copy the speculative register value from global shadow register 128 to an architectural register-operand (indicating the physical register) of the register access instruction.

Embodiments of the present disclosure may provide different components and methods for handling speculatively-executed memory access instructions and speculatively-executed register access instructions under the local commit mode. Instruction execution circuit 112 may receive a sequence of instructions including local commit markers (e.g., COMMIT.LOCAL as shown in FIG. 2).

FIG. 2 illustrates code examples 200 including code 204 generated by a binary translator according to an embodiment of the present disclosure. The original code 202 (e.g., x86 instruction code) may include a loop 206 including several instructions. Binary translator 140 may, based on code 202, generate target code 204. In target code 204, binary translator 140 may specify, using local commit markers (e.g., CMIT.LOCAL), sections of code under the local commit mode, and specify, using global commit markers (e.g., CMIT.GLOBAL), sections of code under the global commit mode. For example, code 204 may run under the local commit mode within loop 206 and run under the global commit mode outside the loop 206.

The sequence of instructions may have been generated by binary translator 140 with code optimization. Thus, the execution of the sequence of instructions may include the OoO speculative execution. Responsive to identifying a local commit marker, instruction execution circuit 112 may first create a local checkpoint to which processing core 106 may roll back in the event that a local rollback event occurs. Further, responsive to identifying the local commit marker, instruction execution circuit 112 may start to speculatively execute instructions under the local commit mode.

Under the local commit mode, instruction execution circuit 112 may identify a memory access instruction (e.g., an instruction that modifies a memory location) and speculatively execute the memory access instruction. The execution of the memory access instruction may cause instruction execution circuit 112 to store a copy of the memory state value in the load/store buffer 120.

Instruction execution circuit 112 may further identify a register access instruction (e.g., an instruction that modifies a physical register) and speculatively execute the register access instruction. During execution of the register access instruction, instruction execution circuit 112 may store the speculative register value in local shadow register 126, where the local shadow register can be implemented as a CoW structure. Subsequent execution of register access instructions may modify the physical register while local shadow register 126 preserves the rollback register state value.

In response to a local commit event (e.g., a second local commit marker), instruction execution circuit 112 may move the content of load/store buffer 120 to one or more cache lines of transactional memory 132. Instruction execution circuit 112 may set the speculation bit of the cache line to the speculative status if the local commit event is within an overarching global commit code region. Instruction execution circuit 112 may copy the speculative register value from the physical register to an architectural register referenced by the register access instruction.

Figure 3A:
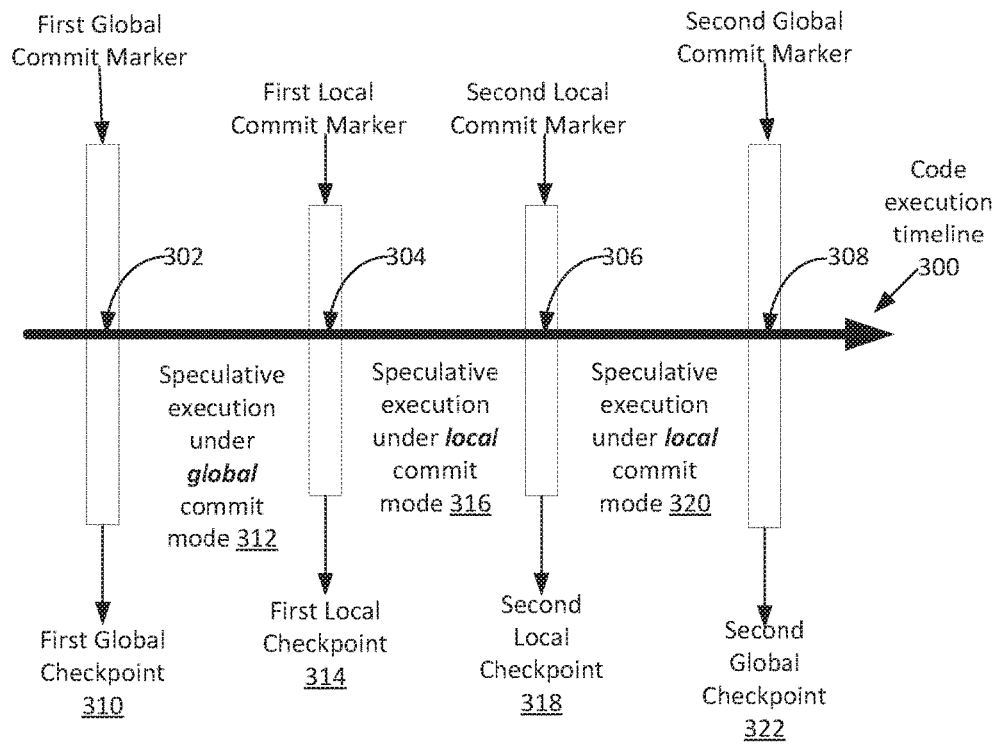
FIG. 3A illustrates an example of hybrid atomicity including a global commit mode and a local commit mode according to an embodiment of the present disclosure.

FIG. 3A illustrates an example of hybrid atomicity including a global commit mode and a local commit mode according to an embodiment of the present disclosure. In this example, the code sections executing associated with the local commit mode is within the code sections associated with the global commit mode. In other examples, code sections associated with the global commit mode may be within the code sections associated with the local commit mode. In such situation, the global commit events may force the local commit mode to break into sub-sections. Referring to FIG. 3A, instruction execution circuit 112 may receive instructions to be executed according to a sequence 300. The execution of these instructions may include OoO speculative execution of instructions that may require transaction atomicity. The sequence of instructions may have been generated by a binary translator using code optimization. The instructions may include global commit markers (e.g., COMMIT.GLOBAL), local commit markers (e.g., COMMIT.LOCAL), memory access instructions, and register access instructions as discussed above in conjunction with FIG. 1.

Instruction execution circuit 112 may, at 302, identify the first global commit marker in the code. Responsive to identifying the first global commit marker, instruction execution circuit 112 may create the first global checkpoint 310 by converting all speculative memory state values and speculative register state values into non-speculative as in the following example. For example, instruction execution circuit 112 may clear the speculation bit of cache lines in transactional memory 132 to convert speculative memory state values into non-speculative, and move speculative register values stored in physical registers to target architectural registers. The first global checkpoint 130 may serve as the reference to roll back from a later global rollback event to the preserved state values referenced by the first global checkpoint 130. Subsequent to creating the first global checkpoint 310, instruction execution circuit 112 may start to execute instructions under the global commit mode 312. The execution may include speculative execution of memory access instructions and register access instructions.

Instruction execution circuit 112 may further, at 304, identify the first local commit marker in the code. Responsive to identifying the first local commit marker, instruction execution circuit 112 may create the first local checkpoint 314 by converting the speculative memory state values and speculative register state values associated with the local commit mode into non-speculative as in the following example. For example, instruction execution circuit 112 may move the speculative memory state values in load/store buffer 120 into transactional memory 132 (rather than directly into transactional memory 132 as under the global commit mode), and move speculative register values stored physical registers to target architectural registers. The speculative memory state values may be stored in cache lines with the speculation bit set to the speculative status. The first local checkpoint 134 may serve at the rollback point for a later global rollback event. Subsequent to creating the first local checkpoint 314, instruction execution circuit 112 may start to execute instructions under the local commit mode 316. The execution may include speculative execution of memory access instructions and register access instructions.

Similarly, instruction execution circuit 112 may, at 306, identify a second local commit marker and create a second local checkpoint 318. Second local checkpoint 318 may replace first local checkpoint 314 as the rollback point for local rollback events. Instruction execution circuit 112 may then start to execute instructions under the local commit mode 320.

Instruction execution circuit 112 may further, at 308, identify a second global commit marker and create a second global checkpoint 322. In one embodiment, the creation of the second global checkpoint 322 may include first copying the speculative register state values from shadow register set 216 to the corresponding architectural registers, and moving the speculative memory state values from load/store buffer 120 to transactional memory 132. The conversion of the speculative state values under the local commit mode to non-speculative is because the speculative optimization is not allowed across the boundary of transactional memory.

Instruction execution circuit 112 may encounter global/local rollback events that may force aborting the transaction and rolling back the state values of processing core 106 to the corresponding global/local checkpoint. A global rollback event can be a global commit fault including such as, for example, x86 level exceptions, interrupts, XABORTS, external cache snoops, Write-set cache line eviction etc. When these global rollback events occur within a global commit code region, they cause a global abort and the global rollback. A local rollback event can be micro-architectural and BT-specific events that cause local aborts (not x86 global level aborts). These local aborts are not visible at x86 architecture level. The local rollback events may include such as, for example, BT-specific memory speculation failure, BT-specific interrupts/exceptions etc. The hybrid atomicity as described in this disclosure enables the rollback and recovery to a precise local or global checkpoint depending on the type of the fault raised. This capability help further improve the performance of processing core 107 by reducing overhead relating to enforcing transaction atomicity.

Figure 3B:
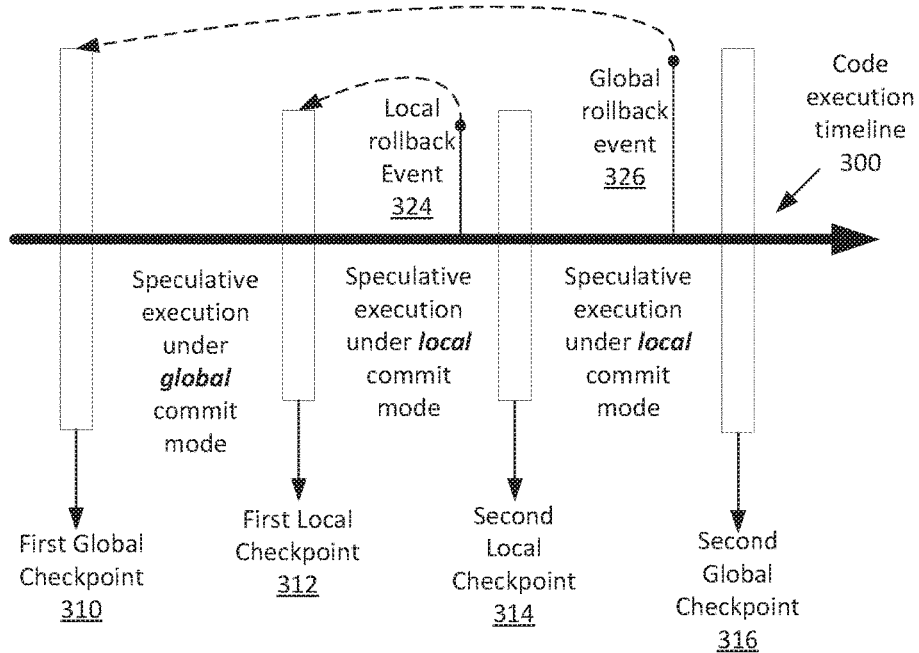
FIG. 3B illustrates examples of rollbacks according to an embodiment of the present disclosure.

FIG. 3B illustrates examples of rollbacks according to an embodiment of the present disclosure. Referring to FIG. 3B, instruction execution circuit 112 may have created global checkpoints and local checkpoints as shown in FIG. 3A. A local rollback event 324 may occur while instruction execution circuit 112. Responsive to detecting local rollback event 324, instruction execution circuit 112 may roll back the state values of processing core 106 to first local checkpoint 312. Because the hybrid atomicity (two levels), instruction execution circuit 112 does not need to roll back the speculative memory state values in L1 data cache 124 and the speculative register state values in global shadow register set 128 to the first global checkpoint 310, thus reducing the overhead associated with enforcing transaction atomicity. The local rollback event 324 may include retrieve the preserved register state value from local shadow register 126 and the memory state value from a location referenced by the local check point 312.

Similarly, a global rollback event 326 may occur. Responsive to detecting global rollback event 326, instruction execution circuit 112 may roll back speculative register state values stored in global shadow register 128 and speculative memory state values stored in L1 data cache 124 to the first global checkpoint.

Figure 4:
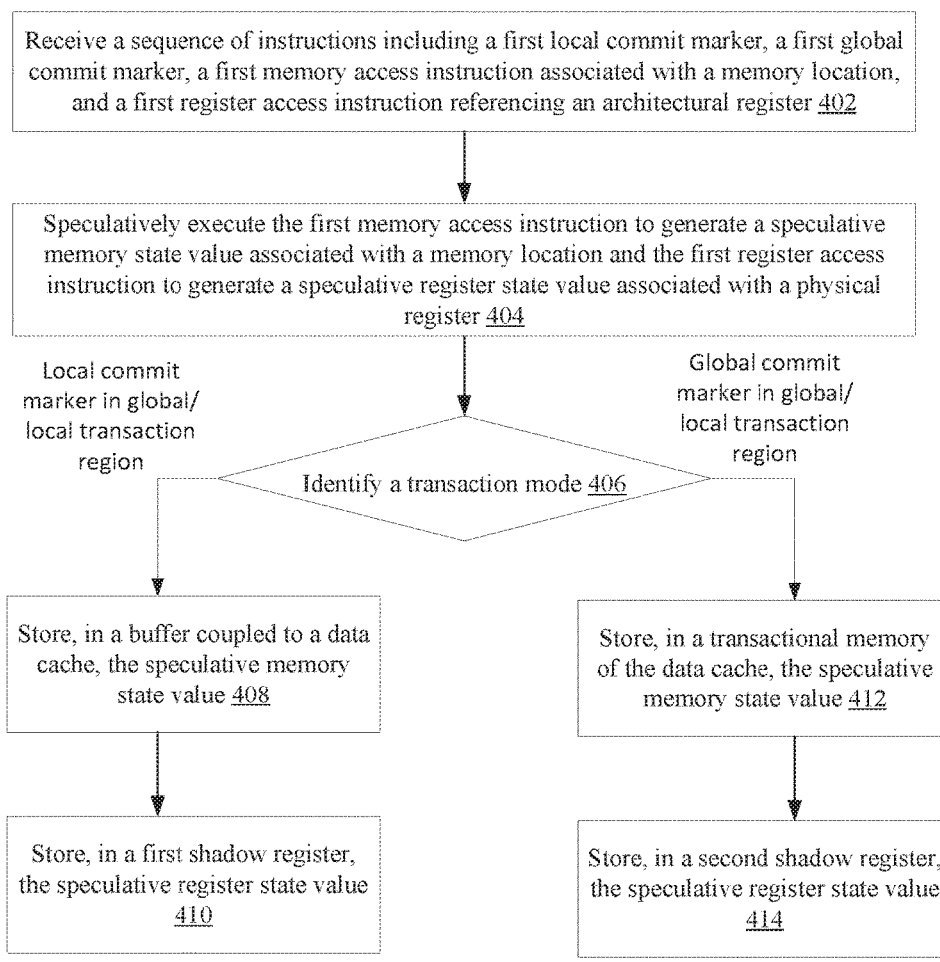
FIG. 4 is a block diagram of a method 400 to execute BT code according to an embodiment of the present disclosure.

FIG. 4 is a block diagram of a method 400 to execute BT code according to an embodiment of the present disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processor 102 and processing core 106, as shown in FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, the processing device, at 402, may receive a sequence of instructions including a first local commit marker, a first global commit marker, a first memory access instruction associated with a memory location, and a first register access instruction referencing an architectural register.

At 404, the processing device may speculatively execute the first memory access instruction to generate a speculative memory state value associated with a memory location and the first register access instruction to generate a speculative register state value associated with a physical register.

At 406, processing device may identify a transaction mode that may be determined based on the active commit markers. The transaction mode can be "not in a transactional region" (i.e., not in the global commit code region nor in the local commit code region), or "in a global but not local transactional region" (i.e., in the global commit code region but not in the local commit code region), or "in a local transactional region" (i.e., not in the global commit code region but in the local commit code region), or "in both the global and local transaction region (i.e., in the local commit code region which is within a global commit code region).

Responsive to identifying the local commit marker in the global and local transactional region, at 408, the processing device may store, in a buffer coupled to a data cache, the speculative memory state value, and at 410, the processing device may store, in a first shadow register, the speculative register state value.

Responsive to identifying the global commit marker in the global and local transactional region, at 412, the processing device may store, in a transactional memory of the data cache, the speculative memory state value, and at 414, the processing device may store, in a second shadow register, the speculative register state value.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 102 described with respect to FIG. 1. In particular, processor 500 may include processing core 106 as shown in FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processor 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor 500 as a pipeline includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
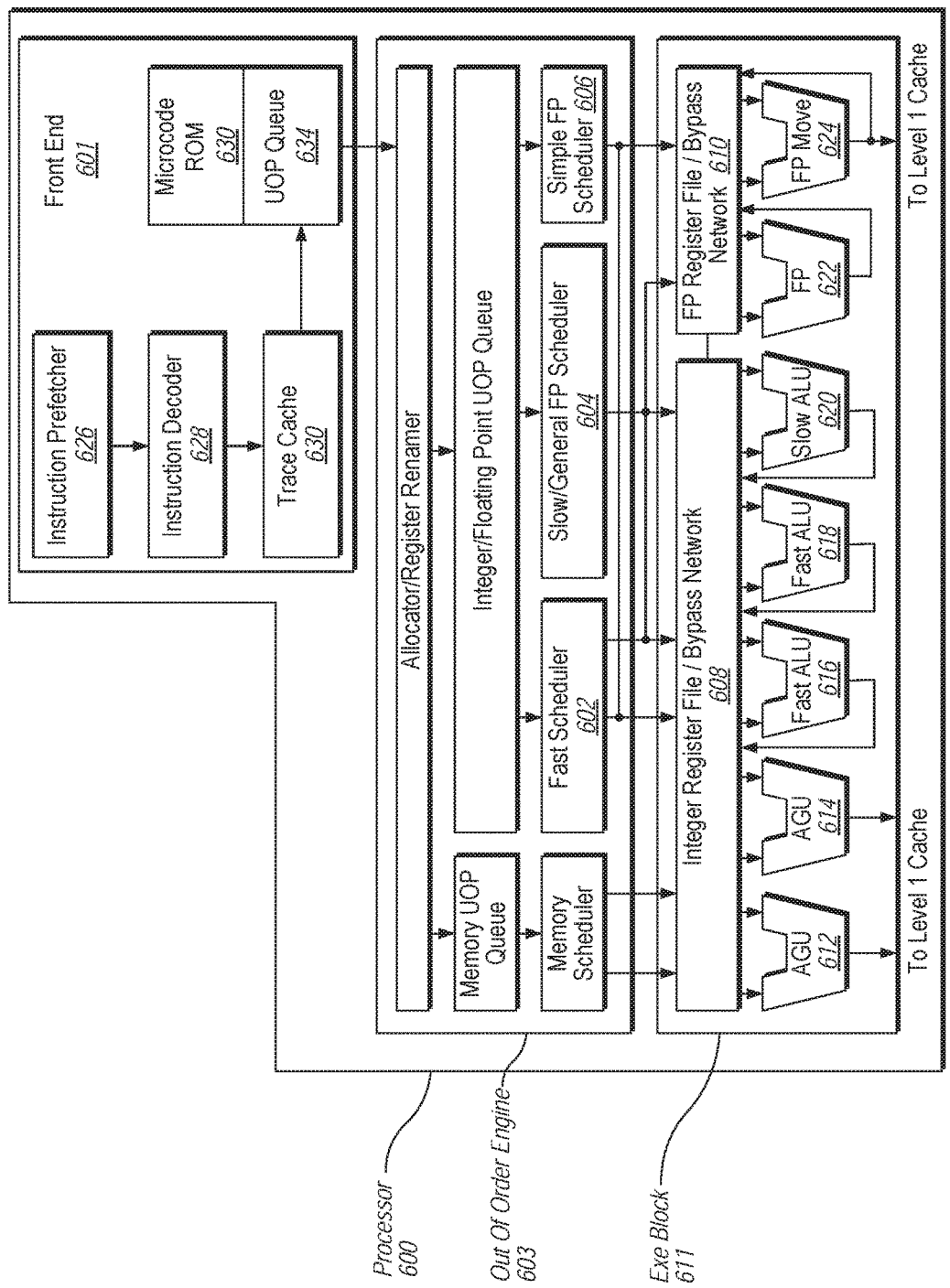
FIG. 6 illustrates a block diagram of the micro-architecture for a processor that includes logic in accordance with one embodiment of the disclosure.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
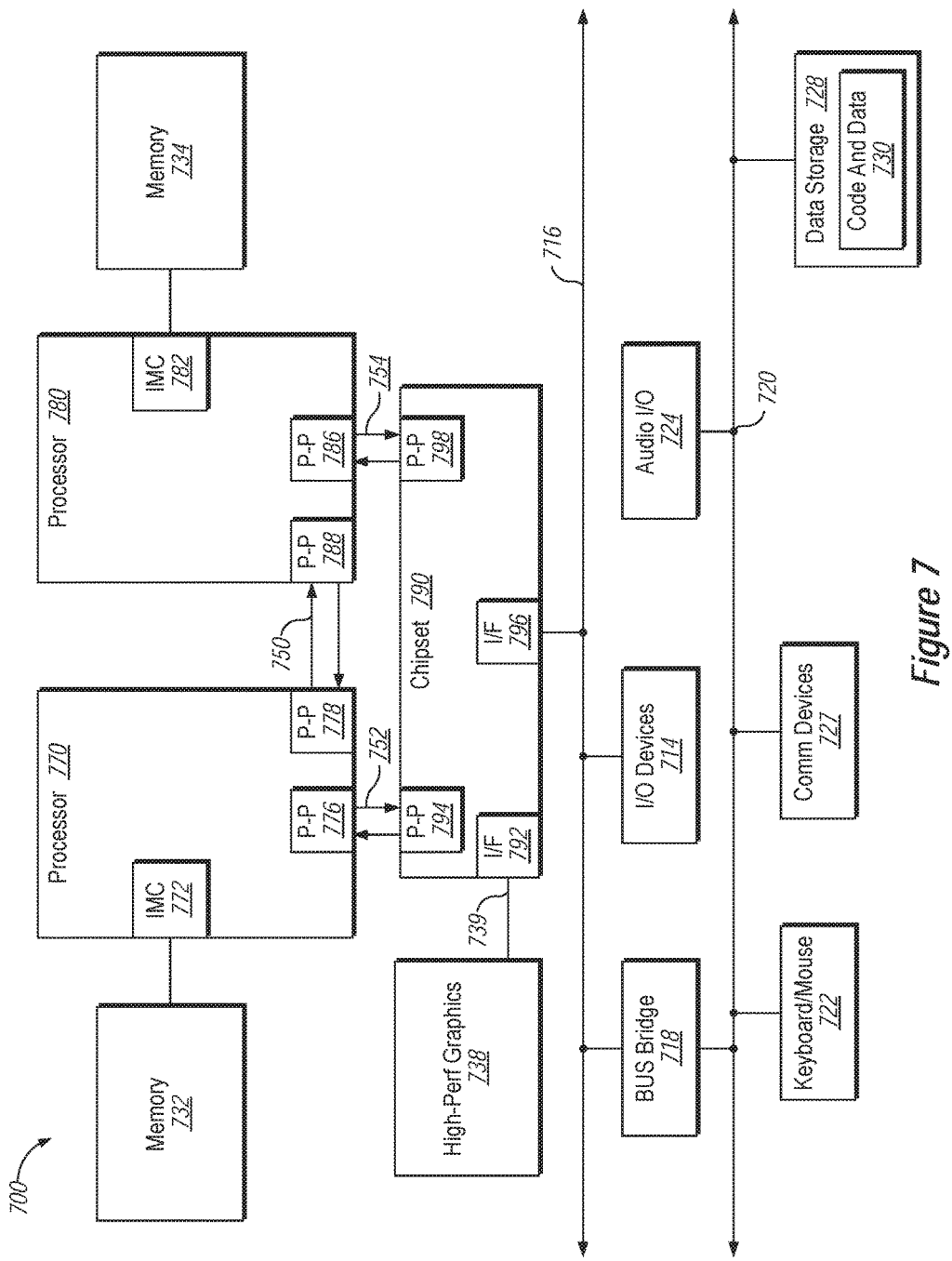
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
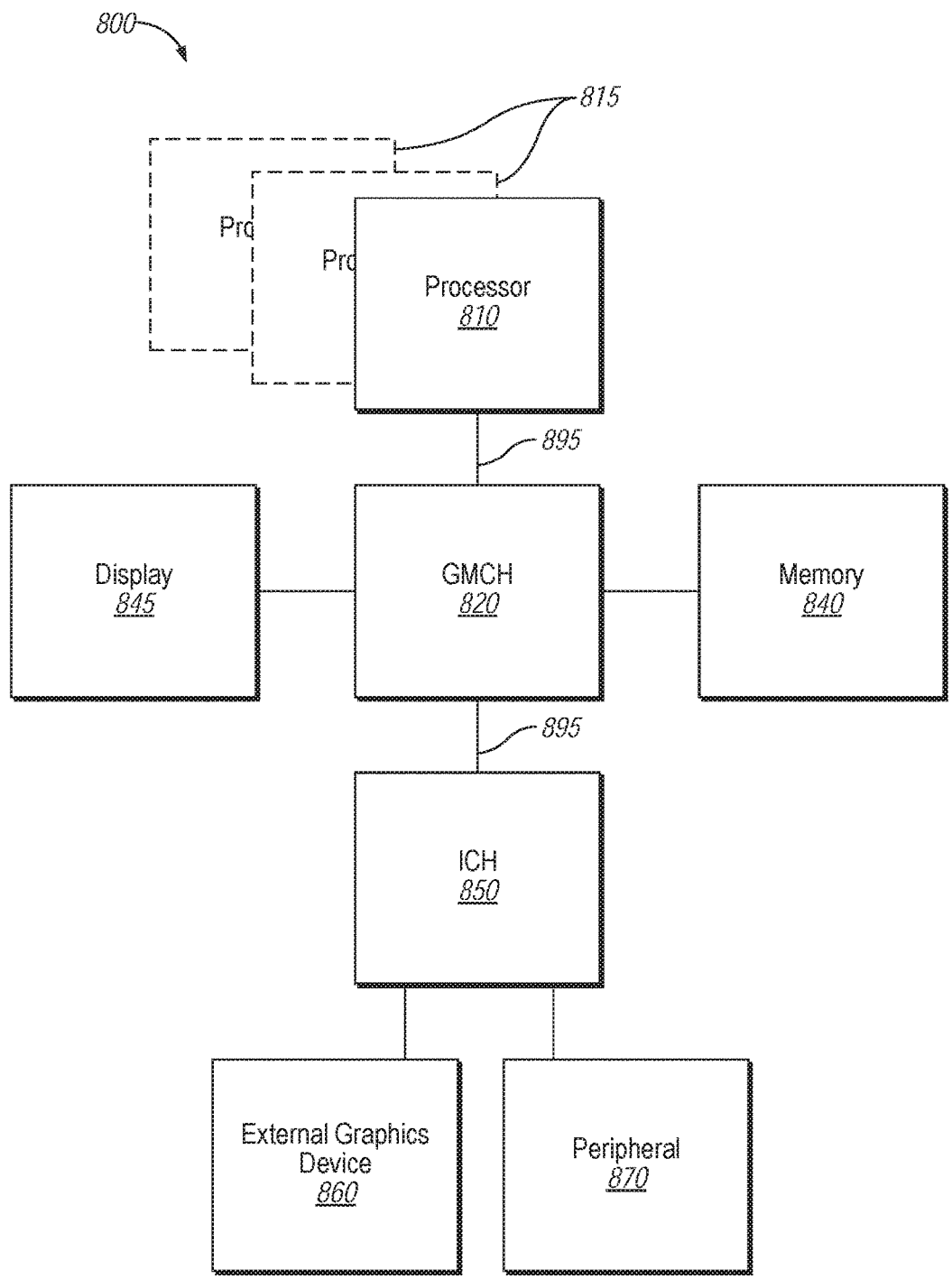
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
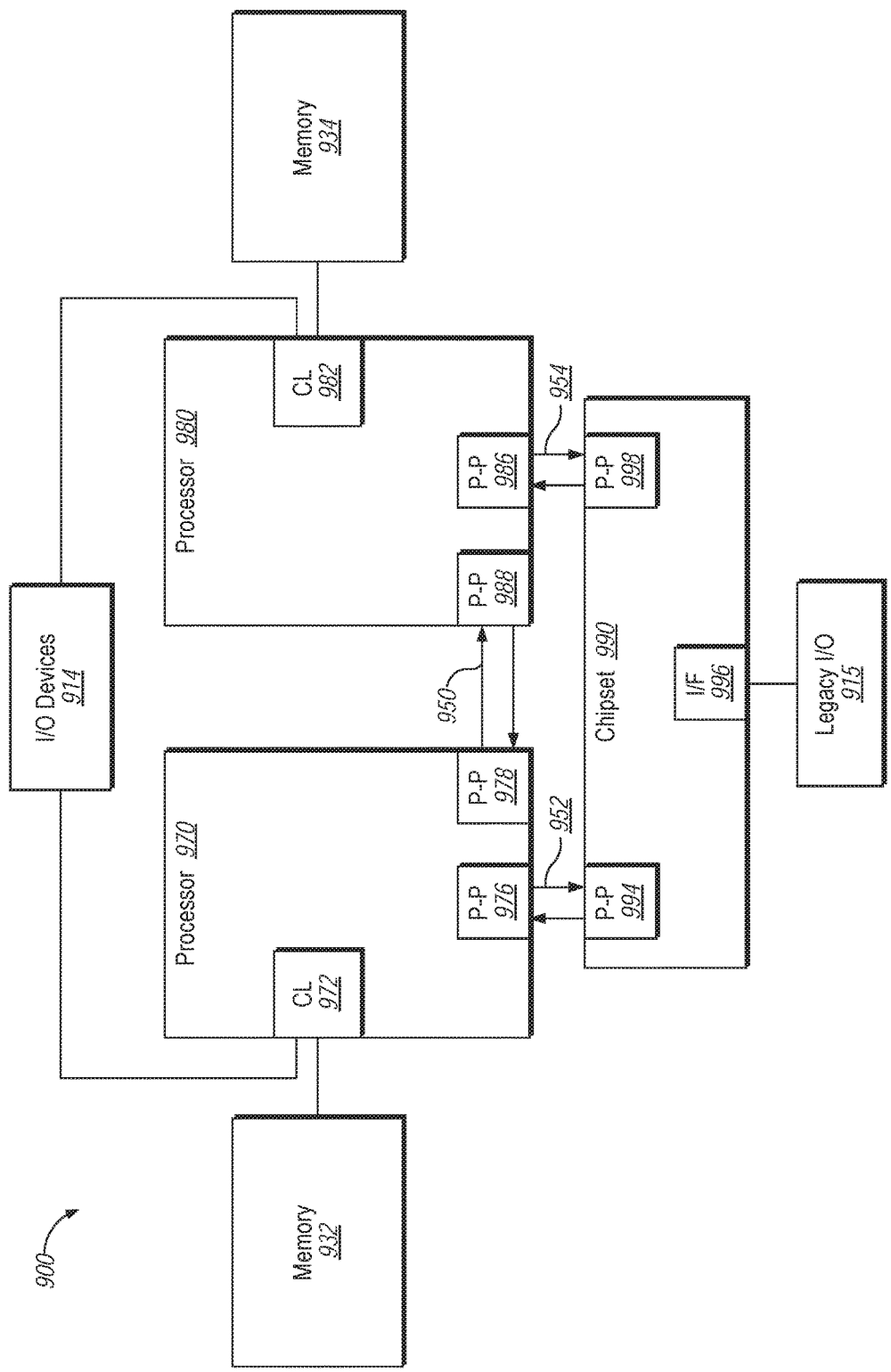
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
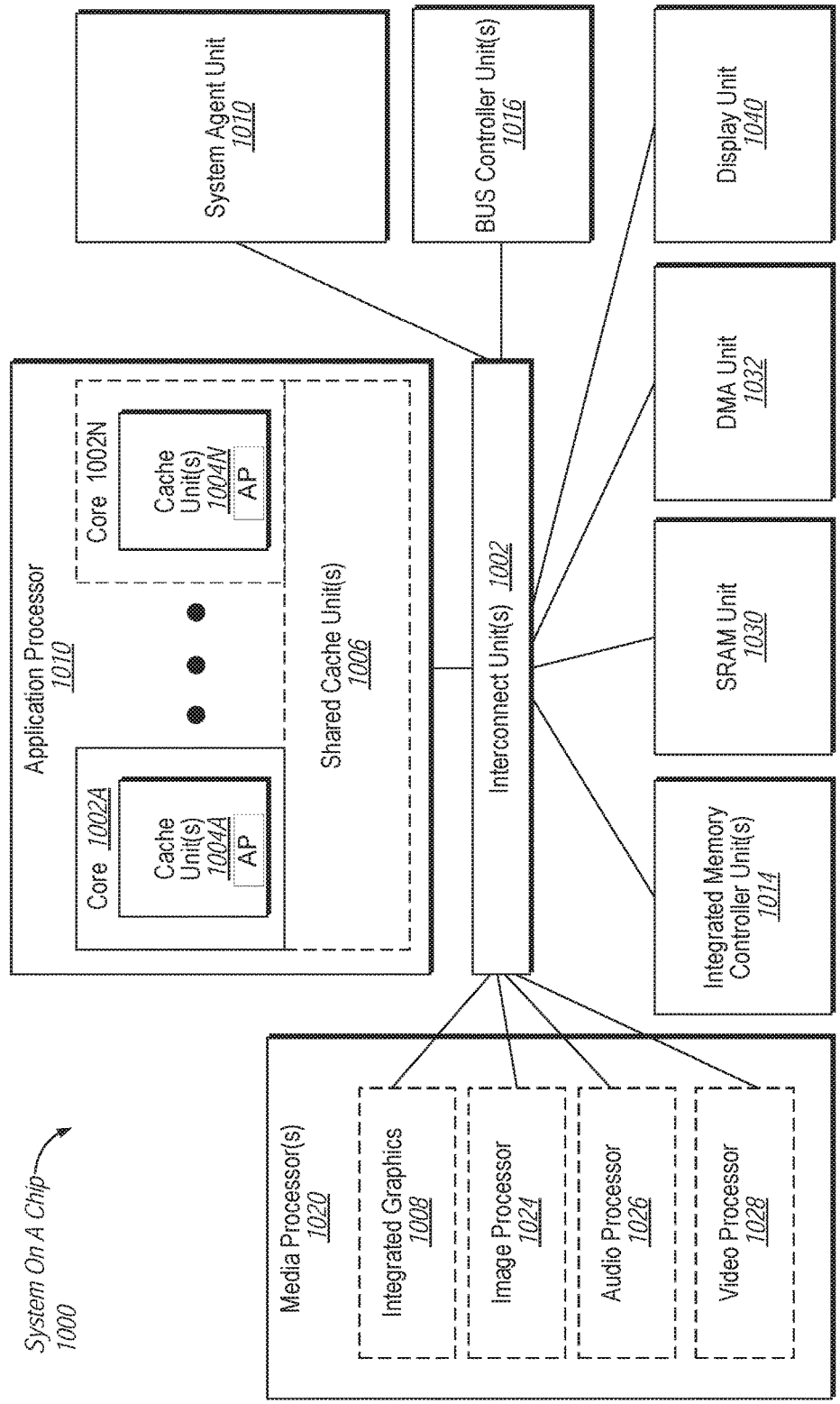
FIG. 10 is a block diagram of a System-on-a-Chip (SoC) in accordance with an embodiment of the present disclosure.

Embodiments may be implemented in many different system types. FIG. 10 is a block diagram of a SoC 1000 in accordance with an embodiment of the present disclosure. Dashed lined boxes are optional features on more advanced SoCs. In some implementations, SoC 1000 as shown in FIG. 10 includes features of the SoC 100 as shown in FIG. 1. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
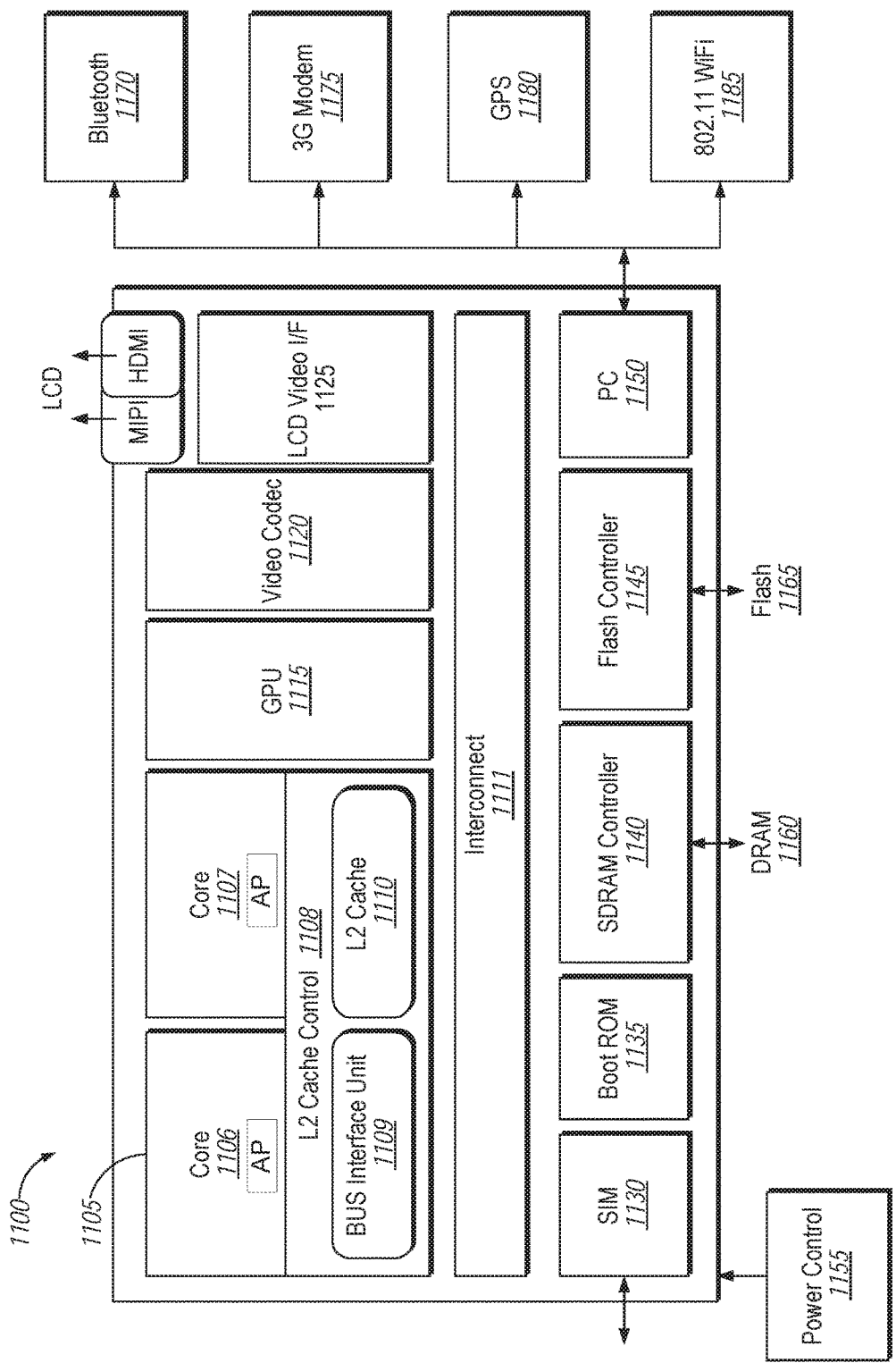
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
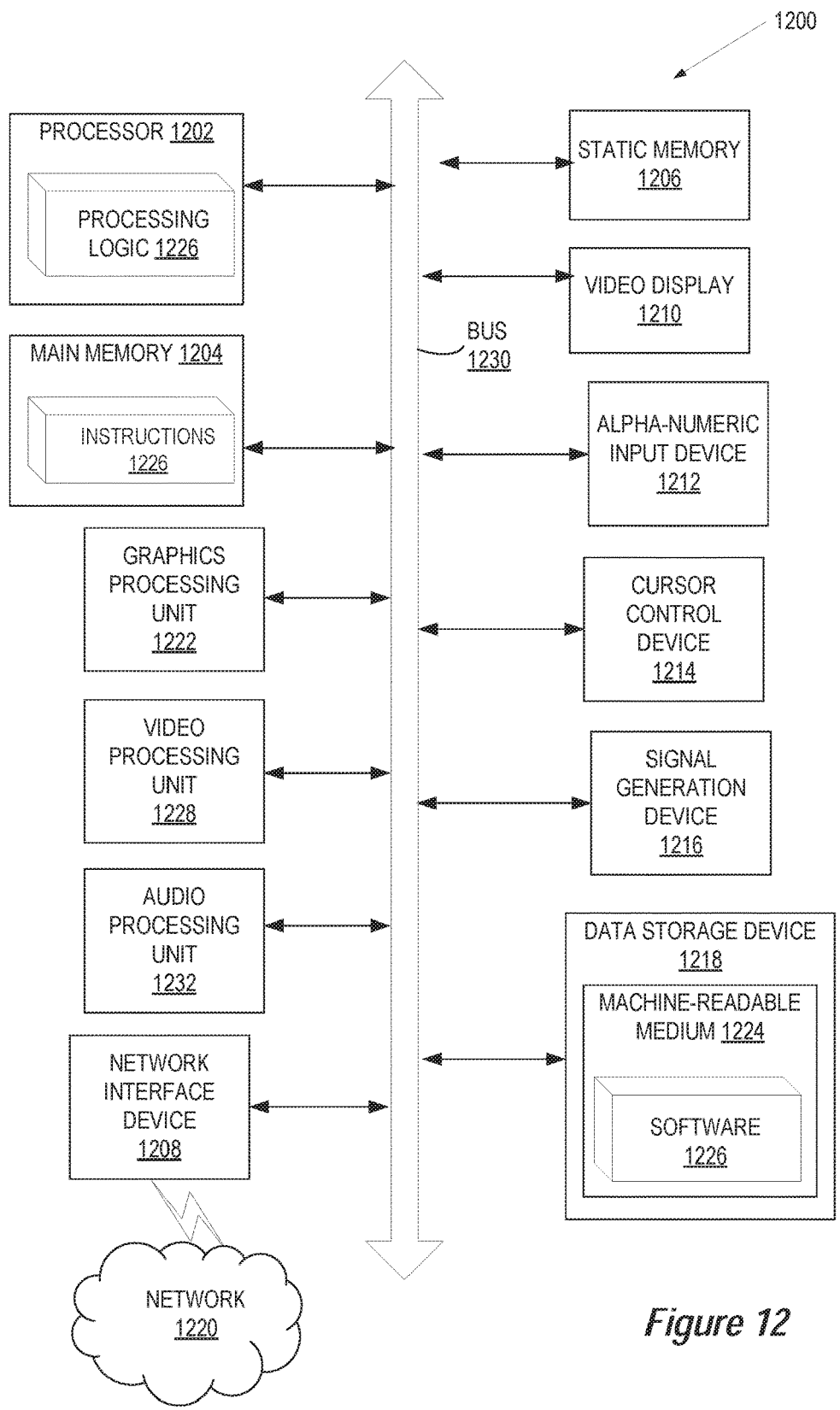
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or more processing cores. The processing device 1202 is configured to execute the processing logic 1226 for performing the operations and steps discussed herein. For example, processing logic 1226 may perform operations as described in FIG. 4. In one embodiment, processing device 1202 is the same as processor architecture 102 described with respect to FIG. 1 as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processor including an instruction retirement circuit, a data cache comprising a transactional memory, a first shadow register set and a second shadow register set, and an instruction execution circuit to receive a sequence of instructions comprising a first local commit marker, a first global commit marker, a first memory access instruction associated with a memory location, and a first register access instruction referencing an architectural register, speculatively execute the first memory access instruction to generate a speculative memory state value associated with the memory location and the first register access instruction to generate a speculative register state value associated with a physical register, responsive to identifying the first local commit marker, store, in a buffer associated with the instruction retirement circuit, the speculative memory state value and store, in the first shadow register, the speculative register state value, and responsive to identifying the first global commit marker, store, in the transactional memory of the data cache, the speculative memory state value, and store, in the second shadow register, the speculative register state value.

In Example 2, the subject matter of Example 1 can further provide that the processing core comprises a binary translator to generate, based on input instructions, the sequence of instructions, and wherein the local commit mode is associated with a first section of code executed, and the global commit mode is associated with a second section of code encompassing the first section of code.

In Example 3, the subject matter of Example 1 can further provide that the instruction execution circuit is further to identify a second local commit marker, responsive to identifying the second commit marker, copy the speculative memory state value from the buffer to a cache line in the transactional memory and set a speculation flag to a speculative status, copy the speculative register state value from the physical register to the architectural register, and generate a local checkpoint referencing the cache line and the architectural register.

In Example 4, the subject matter of any of Examples 1 and 3 can further provide that the instruction execution circuit is further to speculatively execute a second register access instruction to generate a second speculative register state value, store, in the first shadow register, the second speculative register value, identify a local rollback event, and roll back the processing device to the speculative memory state value stored in the cache line referenced by the local checkpoint and to the second speculative register state value stored in the first shadow register.

In Example 5, the subject matter of Example 1 can further provide that the instruction execution circuit is further to identify a second global commit marker and responsive to identifying the second global commit marker, clear a speculation flag associated with the speculative memory states value in the transactional memory, copy the speculative register state value from the physical register to the architectural register, and generate a global checkpoint referencing the cache line and the architectural register.

In Example 6, the subject matter of any of Examples 1 and 5 can further provide that the instruction execution circuit is further to speculatively execute a second register access instruction to generate a second speculative register state value, store, in the second shadow register, the second speculative register value, identify a global rollback event, and roll back the processing device to the speculative memory state value stored in the cache line referenced by the global checkpoint and to the second speculative register state value stored in the second shadow register.

In Example 7, the subject matter of Example 1 can further provide that at least one of the first shadow register or the second shadow register is implemented using a copy-on-write (CoW) structure.

In Example 8, the subject matter of Example 1 can further provide that to store, in the transactional memory of the data cache, the speculative memory state value, the instruction execution circuit is to store, in a cache line in the transactional memory, the speculative memory state value, and set a speculation flag in the cache line to a speculative status.

In Example 9, the subject matter of Example 1 can further provide that the transactional memory comprises a cache line to store the speculative memory value, and wherein the cache line comprises a speculation flag to store a speculative status, and wherein the speculation flag is the read/write status flag of the cache line.

Example 10 is a system comprising a memory, and a processor, communicatively coupled to the memory, comprising an instruction retirement circuit, a data cache comprising a transactional memory, and an instruction execution circuit to receive a sequence of instructions comprising a first local commit marker, a first global commit marker, and a first memory access instruction associated with a memory location, speculatively execute the first memory access instruction to generate a speculative memory state value referenced by the memory location, responsive to identifying the first local commit marker, store, in a buffer associated with the instruction retirement circuit, the speculative memory state value, and responsive to identifying the first global commit marker, store, in the transactional memory of the data cache, the speculative memory state value.

In Example 11, the subject matter of Example 10 can further provide that the instruction execution circuit is further to identify a second local commit marker, and responsive to identifying the second commit marker, copy the speculative memory state value from the buffer to a cache line in the transactional memory and set a speculation flag to a speculative status, and generate a local checkpoint referencing the cache line and the physical register, identify a local rollback event, and roll back the processing device to state values stored in the cache line referenced by the local checkpoint.

In Example 12, the subject matter of Example 10 can further provide that the instruction execution circuit is further to identify a second global commit marker, and responsive to identifying the second global commit marker, clear a speculation flag associated with the speculative memory states value in the transactional memory, and generate a global checkpoint referencing the cache line, identify a global rollback event, and roll back the processing device to state values stored in the cache line referenced by the global checkpoint.

In Example 13, the subject matter of Example 10 can further provide that to store, in the transactional memory of the data cache, the speculative memory state value, the instruction execution circuit is to store, in a cache line in the transactional memory, the speculative memory state value, and set a speculation flag in the cache line to a speculative status.

Example 14 is a processing device comprising a first shadow register, a second shadow register, and an instruction execution circuit, communicatively coupled to the first shadow register and the second shadow register, to receive a sequence of instructions comprising a first local commit marker, a first global commit marker, and a first register access instruction referencing an architectural register, speculatively execute the first register access instruction to generate a speculative register state value associated with a physical register, responsive to identifying the first local commit marker, store, in the first shadow register, the speculative register state value, and responsive to identifying the first global commit marker, store, in the second shadow register, the speculative register state value.

In Example 15, the subject matter of Example 14 can further provide that the instruction execution circuit is further to identify a second local commit marker, and responsive to identifying the second commit marker, copy the speculative register state value from the physical register to the architectural register, and generate a local checkpoint referencing the architectural register, speculatively execute a second register access instruction to generate a second speculative register state value, store, in the first shadow register, the second speculative register value, identify a local rollback event, and roll back the processing device to the speculative memory state value stored in the cache line referenced by the local checkpoint and to the second speculative register state value stored in the first shadow register.

In Example 16, the subject matter of Example 14 can further provide that the instruction execution circuit is further to identify a second global commit marker, and responsive to identifying the second global commit marker, copy the speculative register state value from the physical register to the architectural register, and generate a global checkpoint referencing the cache line and the architectural register, speculatively execute a second register access instruction to generate a second speculative register state value, store, in the second shadow register, the second speculative register value, identify a global rollback event, and roll back the processing device to the speculative memory state value stored in the cache line referenced by the global checkpoint and to the second speculative register state value stored in the second shadow register.

In Example 17, the subject matter of Example 14 can further provide that at least one of the first shadow register or the second shadow register is implemented using a copy-on-write (CoW) structure.

Example 18 is a method comprising receiving, by a processor, a sequence of instructions comprising a first local commit marker, a first global commit marker, a first memory access instruction associated with a memory location, and a first register access instruction referencing an architectural register, speculatively executing the first memory access instruction to generate a speculative memory state value associated with a memory location and the first register access instruction to generate a speculative register state value associated with a physical register, responsive to identifying the first local commit marker, storing, in a buffer coupled to a data cache, the speculative memory state value, and storing, in a first shadow register, the speculative register state value, and responsive to identifying the first global commit marker, storing, in a transactional memory of the data cache, the speculative memory state value, and storing, in a second shadow register, the speculative register state value.

In Example 19, the subject matter of Example 18 can further comprise identifying a second local commit marker, and responsive to identifying the second local commit marker, copying the speculative memory state value from the buffer to a cache line in the transactional memory and set a speculation flag to a speculative status, copy the speculative register state value from the physical register to the architectural register, and generating a local checkpoint referencing the cache line and the architectural register.

In Example 20, the subject matter of Example 18 can further comprise identifying a second global commit marker, and responsive to identifying the second global commit marker, clearing a speculation flag associated with the speculative memory states value in the transactional memory, copy the speculative register state value from the physical register to the architectural register, and generating a global checkpoint referencing the cache line and the architectural register.

Example 21 is an apparatus comprising: means for performing the method of any of Examples 18 to 20.

Example 22 is a machine-readable non-transitory medium having stored thereon program code that, when executed, perform operations comprising receiving, by a processor, a sequence of instructions comprising a first local commit marker, a first global commit marker, a first memory access instruction associated with a memory location, and a first register access instruction referencing an architectural register, speculatively executing the first memory access instruction to generate a speculative memory state value associated with a memory location and the first register access instruction to generate a speculative register state value associated with a physical register, responsive to identifying the first local commit marker, storing, in a buffer coupled to a data cache, the speculative memory state value, and storing, in a first shadow register, the speculative register state value, and responsive to identifying the first global commit marker, storing, in a transactional memory of the data cache, the speculative memory state value, and storing, in a second shadow register, the speculative register state value.

In Example 23, the subject matter of Example 22 can further provide that the operations further comprise identifying a second local commit marker, and responsive to identifying the second local commit marker, copying the speculative memory state value from the buffer to a cache line in the transactional memory and set a speculation flag to a speculative status, copy the speculative register state value from the physical register to the architectural register, and generating a local checkpoint referencing the cache line and the architectural register.

In Example 24, the subject matter of Example 22 can further provide that the operations further comprise identifying a second global commit marker, and responsive to identifying the second global commit marker, clearing a speculation flag associated with the speculative memory states value in the transactional memory, copy the speculative register state value from the physical register to the architectural register, and generating a global checkpoint referencing the cache line and the architectural register.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and/or 'operable to,' in one embodiment, refers to some apparatus, logic, hardware, and/or element designed in such a way to enable use of the apparatus, logic, hardware, and/or element in a specified manner Note as above that use of 'to,' capable of/to,' and/or 'operable to,' in one embodiment, refers to the latent state of an apparatus, logic, hardware, and/or element, where the apparatus, logic, hardware, and/or element is not operating but is designed in such a manner to enable use of an apparatus in a specified manner A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
    a first shadow register;
    a second shadow register;
    a register file comprising a physical register, the register file coupled to the first shadow register and the second shadow register; and
    an instruction execution circuit, communicatively coupled to the first shadow register, to the second shadow register, and to the register file, the instruction execution circuit to:
        receive code comprising a first local commit marker associated with a first section of the code, a first global commit marker associated with a second section of the code that encompasses the first section of the code, and a first register access instruction that references an architectural register;
        speculatively execute the first register access instruction to generate a speculative register state value stored in the physical register;
        responsive to identifying the first local commit marker, store, in the first shadow register, the speculative register state value;
        responsive to identifying the first global commit marker, store, in the second shadow register, the speculative register state value; and
        responsive to identifying a second local commit marker:
            copy the speculative register state value from the physical register to the architectural register; and
            generate a local checkpoint that references the architectural register.

2. The processing device of claim 1, wherein the instruction execution circuit is further to:
    identify a second global commit marker; and
    responsive to identifying the second global commit marker,
        copy the speculative register state value from the physical register to the architectural register; and
        generate a global checkpoint referencing the architectural register;
    speculatively execute a second register access instruction to generate a second speculative register state value;
    store, in the second shadow register, the second speculative register value;
    identify a global rollback event; and
    roll back the processing device to the speculative register state value stored in the architectural register referenced by the global checkpoint and to the second speculative register state value stored in the second shadow register.

3. The processing device of claim 1, wherein at least one of the first shadow register or the second shadow register is implemented using a copy-on-write (CoW) structure.

4. A processing device comprising:
    a first shadow register;
    a second shadow register;
    a physical register coupled to the first shadow register and the second shadow register; and
    an instruction execution circuit, communicatively coupled to the first shadow register, the second shadow register, and to the physical register, the instruction execution circuit to:
        receive a sequence of instructions comprising a first local commit marker, a first global commit marker, and a first register access instruction referencing an architectural register;
        speculatively execute the first register access instruction to generate a speculative register state value associated with the physical register;
        responsive to identifying the first local commit marker, store, in the first shadow register, the speculative register state value; and
        responsive to identifying the first global commit marker, store, in the second shadow register, the speculative register state value,
    wherein the instruction execution circuit is further to:
        identify a second local commit marker; and
        responsive to identifying the second local commit marker,
            copy the speculative register state value from the physical register to the architectural register; and
            generate a local checkpoint referencing the architectural register;
        speculatively execute a second register access instruction to generate a second speculative register state value;
        store, in the first shadow register, the second speculative register value;
        identify a local rollback event; and roll back the processing device to the speculative register state value stored in the architectural register referenced by the local checkpoint and to the second speculative register state value stored in the first shadow register.

5. A system comprising:
a main memory; and
a processor, communicatively coupled to the main memory, comprising:
an instruction retirement circuit coupled to a buffer;
a data cache comprising a transactional memory, wherein the transactional memory is also coupled to the buffer; and
an instruction execution circuit coupled to the buffer and to the transactional memory, the instruction execution circuit to:
receive code comprising a first local commit marker associated with a first section of the code, a first global commit marker associated with a second section of the code that encompasses the first section of the code, and a first memory access instruction associated with a memory location of the main memory;
speculatively execute the first memory access instruction to generate a speculative memory state value associated with the memory location;
responsive to identifying the first local commit marker, store, in the buffer, the speculative memory state value;
responsive to identifying the first global commit marker, store, in the transactional memory, the speculative memory state value; and
responsive to identifying a second local commit marker,
copy the speculative memory state value from the buffer to a cache line in the transactional memory;
set a speculation flag associated with the cache line to a speculative status; and
generate a local checkpoint that references the cache line.

6. The system of claim 5, wherein the instruction execution circuit is further to:
identify a local rollback event; and
roll back a state of the processor to the speculative memory state value stored in the cache line referenced by the local checkpoint.

7. The system of claim 5, wherein the instruction execution circuit is further to:
identify a second global commit marker; and
responsive to identifying the second global commit marker,
clear the speculation flag associated with the speculative memory state value in the transactional memory; and
generate a global checkpoint referencing the cache line;
identify a global rollback event; and
roll back a state of the processor to the speculative memory state value stored in the cache line referenced by the global checkpoint.

8. A processing device comprising:
an instruction retirement circuit coupled to a buffer;
a data cache comprising a transactional memory, wherein the transactional memory is also coupled to the buffer;
a first shadow register and a second shadow register;
a register file comprising a physical register, the register file coupled to the first shadow register and the second shadow register; and
an instruction execution circuit coupled to the data cache, to the register file, to the first shadow register, and to the second shadow register, the instruction execution circuit to:
receive code comprising a first local commit marker associated with a first section of the code, a first global commit marker associated with a second section of the code that encompasses the first section of the code, a first memory access instruction referencing a memory location, and a first register access instruction that references an architectural register;
speculatively execute the first memory access instruction to generate a speculative memory state value associated with the memory location and the first register access instruction to generate a speculative register state value stored in the physical register;
responsive to identifying the first local commit marker,
store, in the buffer, the speculative memory state value; and
store, in the first shadow register, the speculative register state value from the physical register; and
responsive to identifying the first global commit marker,
store, in the transactional memory of the data cache, the speculative memory state value; and
store, in the second shadow register, the speculative register state value from the physical register.

9. The processing device of claim 8, further comprising a binary translator to generate the code based on input instructions.

10. The processing device of claim 8, wherein the instruction execution circuit is further to:
identify a second local commit marker; and
responsive to identifying the second commit marker,
copy the speculative memory state value from the buffer to a cache line in the transactional memory and set a speculation flag to a speculative status;
copy the speculative register state value from the physical register to the architectural register; and
generate a local checkpoint that references the cache line and the architectural register.

11. The processing device of claim 10, wherein the instruction execution circuit is further to:
speculatively execute a second register access instruction to generate a second speculative register state value;
store, in the first shadow register, the second speculative register value;
identify a local rollback event; and
roll back the processing device to the speculative memory state value stored in the cache line referenced by the local checkpoint and to the second speculative register state value stored in the first shadow register.

12. The processing device of claim 10, wherein the instruction execution circuit is further to:
identify a second global commit marker; and
responsive to identifying the second global commit marker,
clear a speculation flag associated with the speculative memory states value in the transactional memory;
copy the speculative register state value from the physical register to the architectural register; and
generate a global checkpoint referencing the cache line and the architectural register.

13. The processing device of claim 12, wherein the instruction execution circuit is further to:
  speculatively execute a second register access instruction to generate a second speculative register state value;
  store, in the second shadow register, the second speculative register state value;
  identify a global rollback event; and
  roll back the processing device to the speculative memory state value stored in the cache line referenced by the global checkpoint and to the second speculative register state value stored in the second shadow register.

14. The processing device of claim 8, wherein at least one of the first shadow register or the second shadow register is implemented using a copy-on-write (CoW) structure.

15. The processing device of claim 8, wherein to store, in the transactional memory of the data cache, the speculative memory state value, the instruction execution circuit is to:
  store, in a cache line in the transactional memory, the speculative memory state value; and
  set a speculation flag in the cache line to a speculative status.

16. The processing device of claim 8, wherein the transactional memory comprises a cache line to store the speculative memory value, and wherein the cache line comprises a speculation flag to store a speculative status, and wherein the speculation flag is a read/write status flag of the cache line.

17. A method comprising:
  receiving, by a processor, code comprising a first local commit marker associated with a first section of the code, a first global commit marker associated with a second section of the code that encompasses the first section of the code, a first memory access instruction associated with a memory location, and a first register access instruction that references an architectural register;
  speculatively executing the first memory access instruction to generate a speculative memory state value associated with a memory location and the first register access instruction to generate a speculative register state value stored in a physical register;
  responsive to identifying the first local commit marker,
    storing, in a buffer coupled to a transactional memory, the speculative memory state value; and
    storing, in a first shadow register, the speculative register state value from the physical register; and
  responsive to identifying the first global commit marker,
    storing, in the transactional memory, the speculative memory state value; and
    storing, in a second shadow register, the speculative register state value from the physical register.

18. The method of claim 17, further comprising:
identifying a second local commit marker; and
responsive to identifying the second local commit marker,
  copying the speculative memory state value from the buffer to a cache line in the transactional memory and set a speculation flag to a speculative status;
  copy the speculative register state value from the physical register to the architectural register; and
  generating a local checkpoint that references the cache line and the architectural register.

19. The method of claim 17, further comprising:
identifying a second global commit marker; and
responsive to identifying the second global commit marker,
  clearing a speculation flag associated with the speculative memory states value in the transactional memory;
  copy the speculative register state value from the physical register to the architectural register; and
  generating a global checkpoint referencing a cache line and the architectural register.

* * * * *